United States Patent
Kuehnle (10) Patent No.: US 12,472,943 B2
(45) Date of Patent: Nov. 18, 2025

(54) SYSTEM AND METHOD FOR INSIGHT-TRIGGERED OPPORTUNISTIC IMAGING IN A VEHICLE

(71) Applicant: RM ACQUISITION, LLC, Boise, ID (US)

(72) Inventor: Andreas U. Kuehnle, Villa Park, CA (US)

(73) Assignee: RM ACQUISITION, LLC, Boise, ID (US)

(*) Notice: Subject to any disclaimer, the term of this patent is extended or adjusted under 35 U.S.C. 154(b) by 118 days.

(21) Appl. No.: 18/096,284

(22) Filed: Jan. 12, 2023

(65) Prior Publication Data

US 2024/0239337 A1    Jul. 18, 2024

(51) Int. Cl.
*B60W 30/12* (2020.01)
*G06V 20/56* (2022.01)

(52) U.S. Cl.
CPC .......... *B60W 30/12* (2013.01); *G06V 20/588* (2022.01); *B60W 2420/403* (2013.01); *B60W 2520/14* (2013.01); *B60W 2552/53* (2020.02)

(58) Field of Classification Search
CPC .......... B60W 30/12; B60W 2420/403; B60W 2520/14; B60W 2552/53; G06V 20/588; G06V 20/56; G07C 5/08; H04N 23/64
See application file for complete search history.

(56) References Cited

U.S. PATENT DOCUMENTS

| | | | |
|---|---|---|---|
| 9,691,195 B2 | 6/2017 | Plante | |
| 10,427,655 B2 | 10/2019 | Nix | |
| 11,216,682 B2 * | 1/2022 | Evans | H04N 23/811 |
| 2018/0367752 A1 * | 12/2018 | Donsbach | G06F 18/22 |
| 2021/0124959 A1 * | 4/2021 | Kuehnle | H04N 23/651 |
| 2021/0163035 A1 | 6/2021 | Tezyuka et al. | |
| 2021/0407057 A1 * | 12/2021 | Chopra | G06T 5/50 |
| 2024/0141624 A1 * | 5/2024 | Torttila | G06V 20/56 |

FOREIGN PATENT DOCUMENTS

| | | |
|---|---|---|
| CN | 106803066 A | 6/2017 |
| CN | 111469860 B | 10/2020 |
| JP | 2022049189 A | 3/2022 |

OTHER PUBLICATIONS

Mendez, Oscar, et al. "Taking the scenic route to 3d: Optimising reconstruction from moving cameras." Proceedings of the IEEE International Conference on Computer Vision. 2017. (Year: 2017).*
"System and Method for Opportunisitc Imaging," U.S. Appl. No. 17/576,677, filed Jan. 14, 2022.

* cited by examiner

*Primary Examiner* — Ramya P Burgess
*Assistant Examiner* — Ana D Thomas
(74) *Attorney, Agent, or Firm* — MARSHALL, GERSTEIN & BORUN LLP

(57) ABSTRACT

A system and method for insight-triggered opportunistic imaging in a vehicle are provided. In one embodiment, a plurality of images are captured opportunistically using an image capture device in a vehicle. A compressive sensing sampling technique is used to store a subset of image pixels of at least some of the plurality of images. A retention filter is applied to the plurality of images to select a subset of the plurality of images to retain based on a signal from a sensor in the vehicle. The retained image information can be sent to an entity external to the vehicle for processing.

22 Claims, 4 Drawing Sheets

SYSTEM AND METHOD FOR INSIGHT-TRIGGERED OPPORTUNISTIC IMAGING IN A VEHICLE

BACKGROUND

Some vehicles (e.g., a tractor capable of towing a trailer) can be equipped with one or more externally-facing image capture devices to capture images of objects/events outside of the vehicle (e.g., in front of the vehicle, behind the vehicle, to either side of the vehicle, etc.). Such images and vehicle sensor information gathered around the time of image capture can be wirelessly transmitted from the vehicle to a server for analysis to determine the circumstances surrounding a collision or other event.

SUMMARY

The following embodiments relate to a system and method for insight-triggered opportunistic imaging in a vehicle. In one embodiment, a non-transitory computer-readable storage medium storing computer-readable instructions that, when executed by one or more processors in a vehicle comprising an image capture device, cause the one or more processors to: cause the image capture device to capture a plurality of images at a regular frequency; cause the image capture device to capture a plurality of additional images in response to available processing time of the one or more processors being above a threshold (wherein the plurality of additional images are perhaps captured at an irregular frequency); and select a subset of the plurality of additional images to retain based on signals from at least one sensor in the vehicle.

In another embodiment, a method is provided that is performed in one or more processors in a vehicle. The method comprises: opportunistically capturing a plurality of images using an image capture device in the vehicle; using a compressive sensing sampling technique to store a subset of image pixels of at least some of the plurality of images; and applying a retention filter to the plurality of images to select a subset of the plurality of images to retain based on a signal from a sensor in the vehicle.

In yet another embodiment, a system is provided comprising means for causing an image capture device in a vehicle to opportunistically capture a plurality of images; means for sampling a subset of image pixels of at least some of the plurality of images; and means for selecting a subset of the plurality of images to retain based on a signal from a sensor in the vehicle.

In another embodiment, an opportunistic data capture system with subsequent curation is provided. The system comprises: a memory; and one or more processors configured to: capture data in response to available processing time; and apply a retention filter to the captured data to select a subset of the captured data to retain in the memory.

Other embodiments are possible, and each of the embodiments can be used alone or together in combination.

DETAILED DESCRIPTION

As mentioned above, some vehicles (e.g., a tractor capable of towing a trailer, a car, etc.) can be equipped with one or more externally-facing image capture devices (e.g., cameras) to capture images of objects/events outside of the vehicle. Such images and vehicle sensor information gathered around the time of image capture can be wirelessly transmitted from the vehicle to a server for analysis to determine the circumstances surrounding a collision or other event.

For storage efficiency, a processor (e.g., a central processing unit (CPU)) in the vehicle can compress the images captured by the image capture device (e.g., using a lossy compression scheme, such as JPEG). As the time needed to analyze a given image can vary and to help ensure the processor has bandwidth in case it is called upon for other processing, the processor can be configured to use less than 100% of its potential utilization. For example, if the processor is capable of capturing and analyzing 10 images per second, it can be configured to capture and process only five images per second, resulting in a 50% utilization of the processor. However, incident analysis, typically done ex post facto, of a collision or other event can often benefit from having additional images. For example, while the standard frame rate may capture images of a collision, they might not capture the license plate of the other vehicle in a collision. Additional images can help capture that other information. U.S. patent application Ser. No. 17/576,677, filed Jan. 14, 2022, which is hereby incorporated by reference, provides a system and method for "opportunistic imaging," where the unused processing capacity of the processor is occasionally used to capture additional images. It should be understood that the details presented in that application are just examples and should not be read as limiting the claims in this application.

The following embodiments can provide additional improvements of any suitable opportunistic imaging system. For example, many of the images taken opportunistically may not be useful, and transmitting or longer-term storing of such images can needlessly consume resources. So, in one embodiment, a set of rules is applied to the images taken opportunistically and only those images satisfying the retaining condition are kept. These rules can be based on signals from one or more sensors in the vehicle. As another example, compressing an image using a lossy compression scheme, such as JPEG, can degrade the quality of the image to the point where measurements in the image cannot be accurately made or license plate numbers in the image cannot be read. So, in another embodiment, instead of using a lossy compression scheme, such as JPEG, a lossless compression scheme is used that only stores a subset (e.g., 5-10%) of pixels of the image (the number and location of pixels can vary between at least some of the images). This approach can also reduce image processing time by the processor. While these embodiments can be used separately, using them together can result in a set of images that are captured at an irregular frequency (because of the opportunistic nature of the image capture) and have different subsets of stored pixels (e.g., due to random or pseudo-random sampling). However, such irregularly, "random" images can be sufficient for later reconstruction and analysis (e.g., by a more-powerful processor external to the vehicle) using compressive sensing techniques.

Before turning to a discussion of these improvements, the following paragraphs provide a description of an example vehicle of an embodiment. It should be understood that this and the other examples presented herein are merely examples and that other implementations can be used. Accordingly, none of the details below should be read into the claims unless expressly recited therein.

Figure 1:
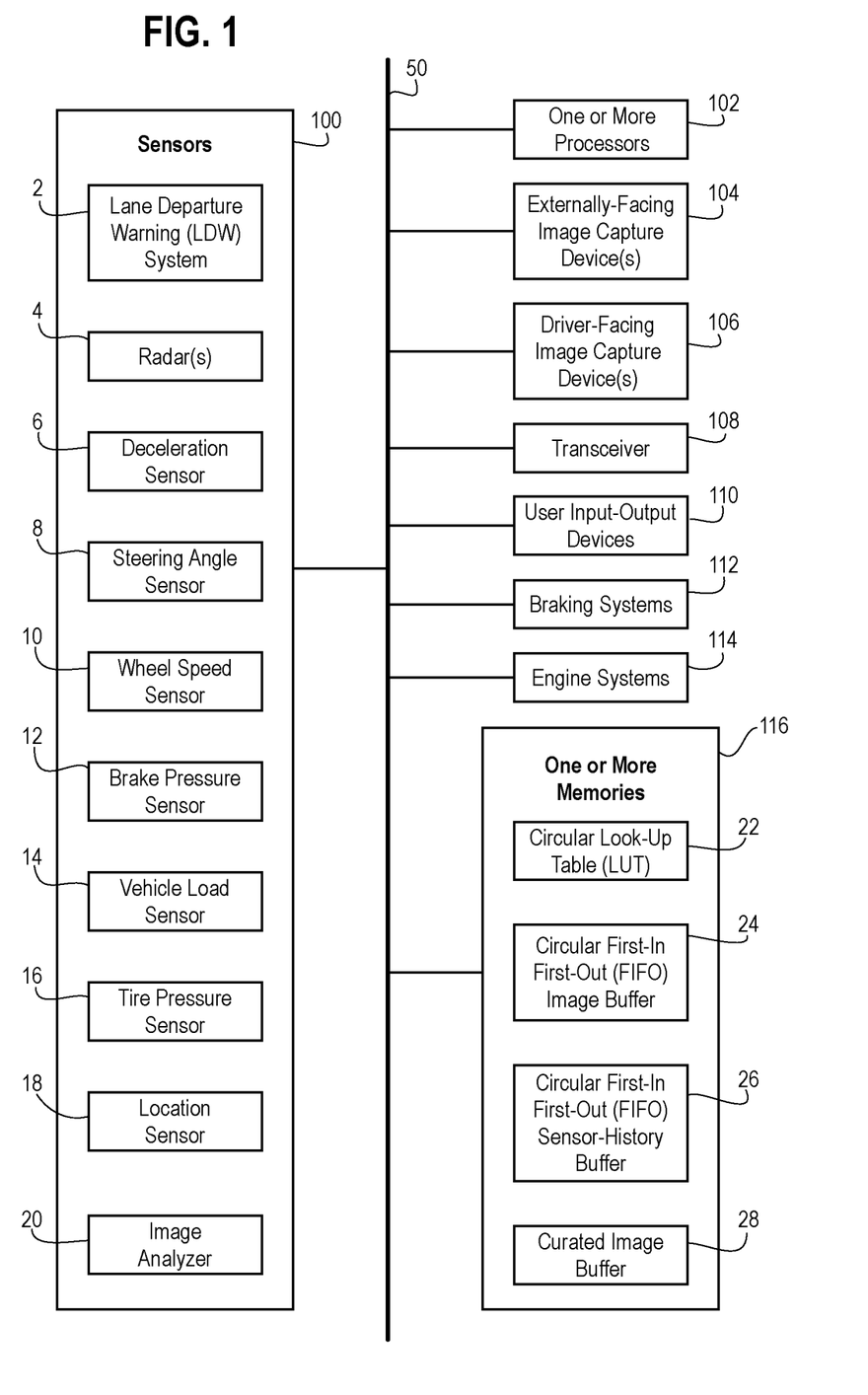
FIG. 1 is a block diagram of a vehicle of an embodiment.

Turning now to the drawings, FIG. 1 is a block diagram of a vehicle of an embodiment, which takes the form of a tractor capable of towing a trailer, although other types of vehicles can be used. As shown in FIG. 1, the vehicle in this example comprises a plurality of sensors 100, one or more processors 102, externally-facing image capture device(s) 104, driver-facing image capture device(s) 106, a transceiver 108, user input-output (IO) devices 110 (e.g., a microphone, a speaker, a touchscreen, indicator lights, etc.), a braking system 112, an engine system 114, and one or more memory devices 116. These various components can be in communication with each other directly or indirectly (through components that may or may not be shown or described herein) via wired or wireless connections. In the example in FIG. 1, the components are directly or indirectly connected via a bus 50, which can take the form of a controller area network (CAN).

In this example, the plurality of sensors 100 comprises a lane departure warning (LDW) system 2, radar(s) 4, a deceleration sensor 6, a steering angle sensor 8, a wheel speed sensor 10, a brake pressure sensor 12, a vehicle load sensor 14, a time pressure sensor 16, a location (e.g., GPS) sensor 18, and an image analyzer 20. Again, these are merely examples, and the vehicle can have more or fewer sensors and/or different types of sensors. Also, in this example, the memories 116 include a circular look-up table (LUT) buffer 22, a circular first-in-first-out (FIFO) image buffer 24, a circular first-in-first-out (FIFO) sensor-history image buffer 26, and a curated image buffer 28. Again, these are only examples. These various memories can be the same type or different types and can be part of the same memory device or be different memory devices. For example, some or all of the memories in the one or more memories 116 can be volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof.

The one or more processors 102 can execute computer-readable program code having instructions (e.g., modules, routines, sub-routine, programs, applications, etc.) that, when executed by the one or more processors 102, cause the one or more processors 102 to perform certain functions, such as some or all of those discussed herein, as well as other functions not described herein. It should be noted that the one or more processors 102 can have different functions (e.g., a first subset of one or more processors can be used for image capture, while a second subset of one or more processors can be used for electronic braking). The computer-readable program code can be stored in a non-transitory computer-readable storage medium, such as in the one or more memories 116. The one or more processors 102 can also take the form of a purely-hardware implementation (e.g., an application-specific integrated circuit (ASIC)).

As discussed above, the one or more processors 102 can be configured to capture images using the externally-facing and/or driver-facing image capture devices 114, 116 as part of its "regular" operations (e.g., when a safety and reporting system is enabled). The number of images captured over time in this "regular" mode can be set so that the one or more processors 102 do not reach full utilization (e.g., to at least occasionally leave available processing time to perform other functions, if needed). For example, if the one or more processors 102 are capable of capturing and processing 10 images per second, they can be configured to capture and process only five images per second, resulting in a 50% utilization of the processor. Images may be captured and stored in this "regular" mode, creating a DVR function, or they may be captured, analyzed, and stored when the circumstances so dictate (e.g. during a safety-relevant driving event such as a period of excessive braking). The time between subsequent images in both modes is relatively large, and it is here that opportunistic imaging may be of help. The remaining idle time of the one or more processors 102 is typically not used. So, in this embodiment, when processing time becomes available (e.g., when available processing time of the one or more processors 102 is above a threshold), the one or more processors 102 can opportunistically use that available processing time to capture additional images. An example of this embodiment will now be discussed in conjunction with the flow chart 200 in FIG. 2.

Figure 2:
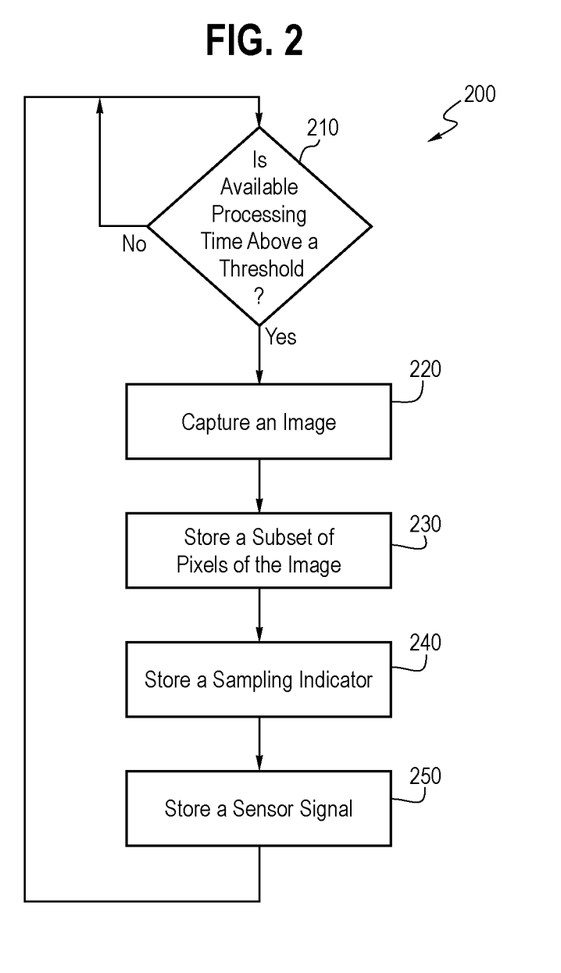
FIG. 2 is a flow chart of a method of an embodiment for opportunistic imaging.

As shown in FIG. 2, the one or more processors 102 determine if the available processing time of the one or more processors 102 is above a threshold (act 210). The threshold can be set to any suitable level. For example, the threshold can be set to the amount needed to capture/process an image. As another example, the threshold can be set to an amount more than what is needed to capture/process an image to help ensure that there will be available processing time for other functions, should they be needed. If the available processing time is not above the threshold, the method loops back to act 210. However, if the available processing time is above the threshold, the one or more processors 102 cause an image to be captured (act 220). While all of the pixels of the captured image can be stored, to save storage space, in this embodiment, only a random subset (e.g., 10%) of the pixels of the captured image are stored in the one or more memories 116 (e.g., in the circular FIFO image buffer 24) (act 230). An indicator of which pixels (i.e., their locations) were sampled is also stored (act 240), so the full image can be reconstructed later. This indicator can take any suitable form. For example, in one embodiment, a sampling "dictionary" (used for reconstruction) is stored, while, in another embodiment, the dictionary is predefined, so only a single value (e.g., "sampling scheme 28") is stored.

Retaining only a randomly sampled fraction of the original image's pixels allows the system to losslessly compress the image (so, the image reconstructed quality is better than using lossy JPEG or other compression). Also, as will be discussed in more detail below, signal(s) from one or more of the sensors 100 can also be stored (e.g., in the circular FIFO sensor-history buffer 26) (act 250). The above steps are repeated, so that additional images can be captured if and when the one or more processors 102 have available sufficient additional processing time (so, the frequency of additional image capture can be irregular).

Figure 6A:
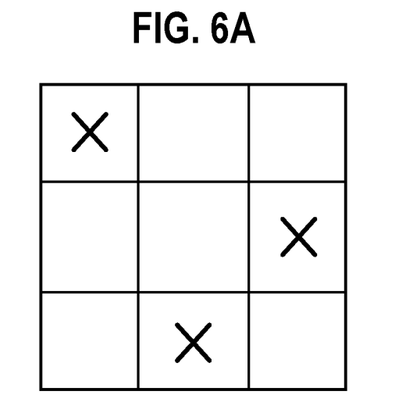
FIGS. 6A, 6B, and 6C are illustrations of individual sampling schemes of an embodiment.
Figure 6B:
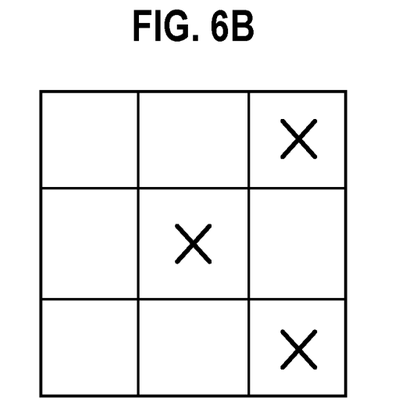
Figure 6C:
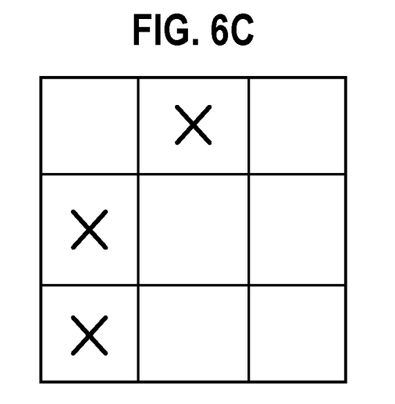

As mentioned above, in this embodiment, only a random subset of the pixels of the captured image are stored. The particular subset of pixels can be selected in any suitable way. For example, in one embodiment, the pixel locations that are selected for storage vary between at least some of the additional images that are opportunistically sampled. In one embodiment, the number and variation in the stored pixels is sufficient for later image reconstruction (e.g., by a more-powerful processor external to the vehicle) using compressive sensing techniques. The pixel selection can be varied in a random or pseudo-random basis to lower the (already low) possibility of not being able to reconstruct an image (by ensuring that at least some images have different pixel locations retained). In one embodiment, the pixel locations to be retained from a given image are read from a circular LUT 22, which provides a table of pixel locations to be used for a certain number (e.g., eight) of images. Once the 8th image has been sampled, the first sampling scheme is repeated. That is, each of the eight sampling schemes is a random subset, and independent of the other subsets. This is illustrated in FIGS. 6A, 6B, and 6C, where, within each individual sampling scheme (in this example, the dictionary has three random sample schemes), the chosen locations are random. The three schemes in this example are used in a round-robin fashion, such that, if desired, they can be combined into a single, regular whole image with all pixels used without overlap.

As mentioned above, some of the images taken opportunistically may not be useful, and transmitting or long-term storing (e.g., in non-volatile memory instead of volatile memory) of such images can needlessly consume resources. So, in one embodiment, a set of rules (e.g., based on signals from one or more sensors 100) is applied to the images taken opportunistically and only those images that satisfy the retaining condition are kept. The general idea to retain a curated collection of occasionally/opportunistically-captured images that give insight into events during driving. Curation can be done both to provide maximum insight from the images and to thin the dataset, because reconstructing the original image is computationally intensive (so, reconstructing only presumably "good" images may be desired).

Figure 3:
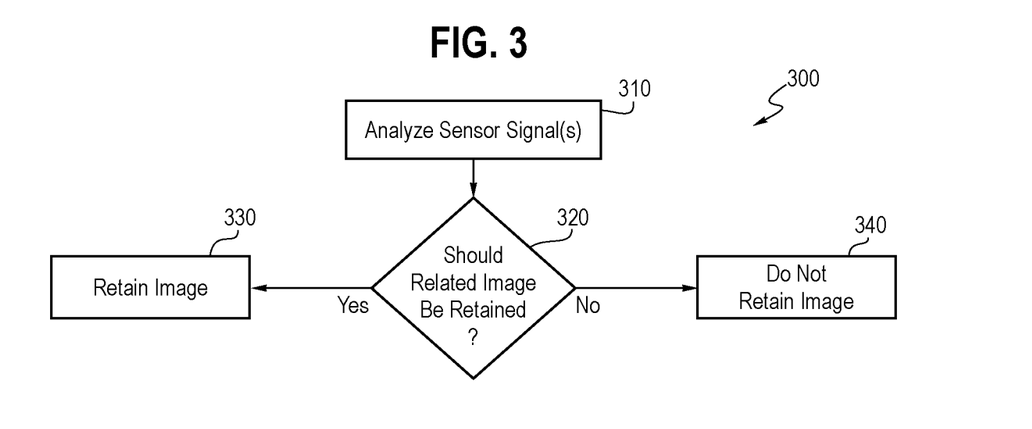
FIG. 3 is a flow chart of a method of an embodiment for determining when an opportunistically-captured image should be retained.

This embodiment will now be described in conjunction with the flow chart 300 in FIG. 3. As shown in FIG. 3, the one or more processors 102 analyze the stored sensor signal(s) with respect to retention rules (act 310) to determine if a given image should be retained (act 320). (The current image may be the best, or an earlier one may be, if available.) If the retention rules are satisfied (e.g., if a non-null value is returned), the image is retained (e.g., in the circular FIFO image buffer 24 or by flagging the original memory location as to not be overwritten) (act 330); otherwise (e.g., if a null value is returned), it is not (act 340). In this example, the curation is done by using a retention trigger/filter based on one or more sensor signals (e.g., captured around the time the image was captured or before, such as when a sensor history is used). If the sensor signal is of a sufficient value or fulfills a specific condition after long enough or at a first or last time, the related image is retained. For all the preceding and perhaps post-ceding images that are associated with a trigger event that is no longer valid, the image buffer memory locations can be tagged as being available for overwriting (e.g., using a linked list of pointers). If a regular vehicle event occurs, e.g. a low forward distance warning, excessive braking, excessive steering angle rate, etc., the system may be configured to retain more opportunistic images than when there is no vehicle event. That is, analysis of a vehicle event may benefit from extra images captured during it, so these may be beneficially retained.

Any suitable retention trigger/filter can be used. The following is an example of one particular implementation of an embodiment where the retention trigger/filter is based on signals from a lane departure warning (LDW) system 2. It should be understood that this is merely an example and that the details discussed below should not be read into the claims unless expressly recited therein. For example, other sensor signals (e.g., entire radar signals or LIDAR) can be used.

In general, the LDW system 2 measures the vehicle's location within a lane and the yaw angle to the lane markings using a forward-facing camera 104. The LDW system 2 is typically used to provide a warning to the driver when the system 2 detects that the driver is veering out of the lane, which can happen when the driver is drowsy or distracted. However, the LDW system 2 can also be used to detect when a driver is about to pass a vehicle. That is, when trying to pass a vehicle ahead, a driver often makes a first investigative foray towards the neighboring lane, looking to see if there is space beyond the vehicle ahead and a clear lane in which to pass. The driver gains insight into the environment and feasibility of passing by altering his lane position. When a (local) maximum value of lane position displacement is attained (i.e., at zero yaw), the view forward is typically most improved and allows the driver to determine if there is space for passing both during the overtaking maneuver and then for returning to the lane and what lies around a bend, if present. As passing a vehicle ahead is a relatively-dangerous act that can result in an accident, it may be desired to retain any opportunistic images that were captured during this time to gain insight into accident circumstances (e.g., was there an oncoming vehicle ahead and the driver chose to pass nonetheless?, perhaps there was a low sun condition, blinding the driver?).

So, in this embodiment, a signal indicating that a sufficient maximum is found in the lane position (e.g., at one meter from lane center) (or, equivalently, that the yaw returns to zero) can be used to retain an opportunistically-captured image. In operation, each opportunistically-captured image can be stored with an associated lane position/yaw value set, and the one or more processors 102 can select for saving those images that have desired lane position/yaw values. It should be noted that, in this embodiment, the LDW system 2 does not trigger 'regular' image capture, as no lane departure is occurring, and is free-running opportunistically when processor time is available. Rather, sensor signal(s) from the LDW system 2 (e.g., lane position values and/or yaw) are used to weed out the presumably best images from those captured by the opportunistic system. That is, the two processes run substantially independent of each other: one process captures images when it can, and the other process looks at the conditions under which the images the first process were captured and retains only the presumably best images.

Figure 4:
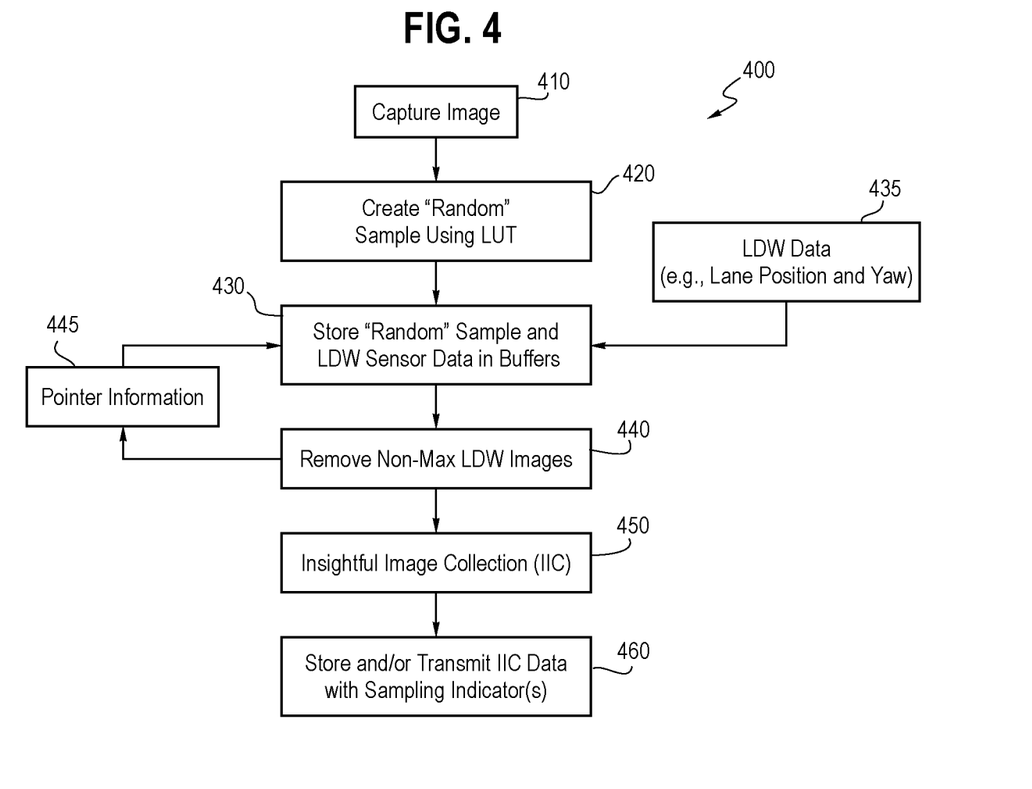
FIG. 4 is a flow chart of a method of an embodiment for insight-triggered opportunistic imaging.

FIG. 4 is a flow chart 400 that illustrates the operation of this example. As shown in FIG. 4, after the one or more processors 102 opportunistically capture an image (e.g., when free processing time exceeds a threshold after other "regular" operations finish) (act 410), the one or more processors 102 create a "random" sample of the image from the pixel locations specified in the circular LUT 22 for the image (act 420). For example, the circular LUT 22 can store a table of pixel locations to be used for eight images. Once the eighth image has been sampled, the first sampling scheme is repeated. Because of this repeat nature, the sampling is done is a somewhat random fashion. Each of the eight sampling schemes is random and independent of the next scheme. The schemes just happen to be reused to simplify reconstruction later, where a random pixel subset is received, along with the pixel locations that generated this subset. In essence, some pieces of a picture puzzle are provided, as well as the locations that these have in the whole puzzle and the entire puzzle is reconstructed from them In this example, each image has an associated lane position/yaw value set and a buffer retains the subsampled images and yaw/lane position values. More specifically, the subset of pixels for the image are stored in the circular FIFO image buffer 24 and LDW signals 435 (e.g., lane position and/or yaw) are stored in the circular FIFO sensor-history buffer 26 (act 430). Also, in this example, those images whose lane position is not at or near a sufficient local maximum away from its average value and to the correct side are removed from the buffer 24 as they presumably do not have maximum insight. So, to retain only the relevant images, the one or more processors 102 can remove the "non-max LDW" images (act 440). This can be done on an image-by-image basis (in an ongoing fashion) or after a certain number of additional images have been captured. To remove an image, the one or more processors 102 can send pointer information 445 of the image to be removed to the circular FIFO image buffer 24, which can use that pointer information 445 to write a new image over an image with non-maximal insight image information. A similar operation can be done for the related sensor data in the circular FIFO sensor-history buffer 26.

The result of the above is a curated set of images, which is referred to in FIG. 4 as an "insightful image collection (IIC)" 450. The one or more processors 102 can stored the IIC data 450 in longer-term (e.g., non-volatile) memory in the vehicle and/or can transmit the IIC data 450 to an external entity, such as a server, via the transceiver 108. An indication of which pixels in the image that were sampled can also be stored/transmitted to allow for later image reconstruction. As mentioned above, the indication can take any suitable form, such as, but not limited to a sampling "dictionary" or a single value (e.g., "sampling scheme 28") when the sampling dictionary is predefined. In this way, the subsample scheme can be duplicated on the decoding system (on or off the vehicle) using the knowledge of the key for each set of pixels used to create the sampled image. If no accident or event occurs, the IIC data in a circular FIFO image buffer 22 can be overwritten/reused.

Figure 5:
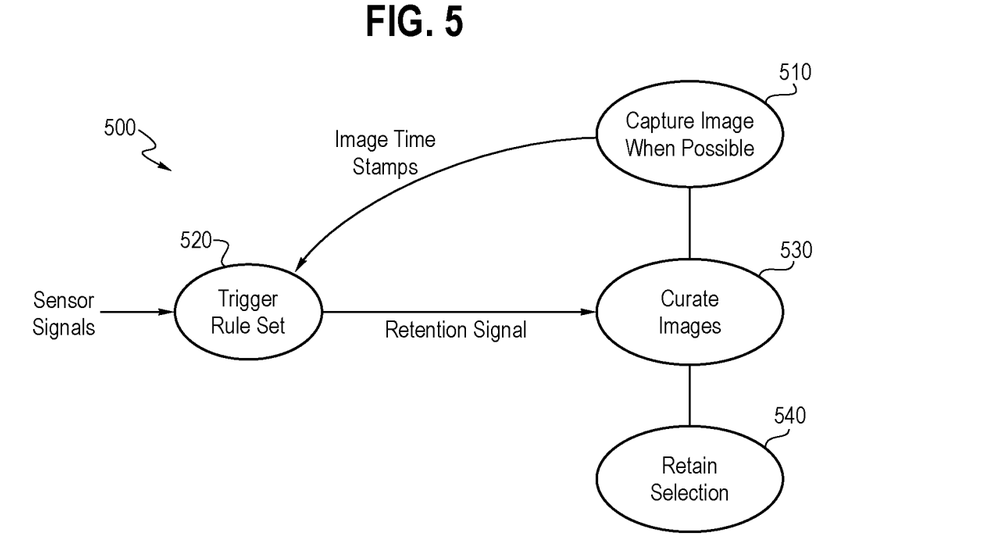
FIG. 5 is a diagram of a system of an embodiment for insight-triggered opportunistic imaging.

FIG. 5 is a diagram 500 that summarizes the above example. As shown in FIG. 5, opportunistic image capture is used to capture images when possible and stores them in a memory (e.g., a buffer) (510). Time stamps (and, optionally, linked-list pointers) of the captured images along with sensor signals taken at or around the same time as the images are applied against a trigger rule set (520), which generates a retention signal to curate the best images (530) (the other images can be discarded or overwritten). The curated images can be retained in longer-term memory (e.g., non-volatile memory) (540) and/or transmitted to an entity external to the vehicle.

It should be noted that, because of the opportunistic nature of the images captured, the system may not exactly capture a maximum insight condition of images. However, in many situations, the "next best" image is still useful (e.g., an image taken when the vehicle is just short of the maximum lane position or one after the maximum lane position is reached) if the image has had a sufficiently large or good sensor value(s).

There are many advantages associated with these embodiments. For example, accident reconstruction and event understanding rely on sufficiently-dense in-time and in-space information (e.g., the higher time resolution that the opportunistic images can provide may give better insight into when more precisely the vehicle ahead started to brake). An image of the event, as well as image(s) before the event (prequel image(s)) and/or after the event (sequel image(s)) with enough details throughout may be desired, with perhaps a tranche of images at just the right instant to understand the timing, causation, and fault origin of the accident or event. However, images captured during regular operation of a safety system may not collect a sufficient number or density of images to fully or adequately reconstruct and understand events leading up to an accident. By using the probabilistic insight-triggered information capture system of these embodiments, opportunistic image capture and compressive sensing can provide additional, helpful images. That is, the additional images can serve to better reconstruct accidents and improve event understanding. As the compressive sensing is lossless, it can provide enhanced details in imagery, though at the cost of extensive computational reconstruction being required.

There are many alternatives that can be used with these embodiments. For example, as noted above, the retention filter can be based on sensor signal(s) other than those from the LDW system 2. Examples of other triggers that can be used include, but are not limited to, a number of radar targets present at a persistent (and perhaps sufficient) maximum number, a primary target angle reaching a (perhaps sufficient) maximum, a freshly-detected new nearby radar target that has persisted for a certain duration (e.g., so an image can be retained from approximately the first detection or after a one-second detection, which approximates a human's reaction time or after a last detection), a differing histogram or exposure and gain in a given image versus earlier images in order to increase dynamic range (as compared with the already-retained imagery's settings), a driver looking away from forward in a multiple-camera surround view context (to retain the last image before the driver returns to looking straight ahead; so, if the driver was looking away for a maximum time and the next frame has the driver looking ahead, an image can be captured of what the driver was looking at and for how long via analysis of the sensor signal history), a sufficiently large or persistent value of deceleration or jerk at the time of image capture (to capture what the driver saw that started this persistently-large deceleration or jerk), steering angle velocity at time of capture (a large value or the first time a sufficiently-large value occurred can indicate the start of something abrupt happening), and a persistent or abrupt change in driver posture, including hands on the steering wheel or other controls In another alternative, time-intermediate sensor signal values without corresponding images can be stored, and the system can examine the "without image" and "with image" sensor signal values to determine whether a captured image fulfills the retention conditions (at least closely enough). In addition, prequel time sensor signal values may be captured and stored along with the opportunistic images. For example, vehicle deceleration or steering angle signals can be stored at a 100 msec spacing but opportunistic images can be captured only every 600 msec during an event. These time-intermediate vehicle dynamic signals may be as important as the occasional additional imagery. So, even if images are not captured at the ideal time, images captured near in time may be good enough. It may be beneficial to use these embodiments when opportunistic images cannot be captured that often or reliably (e.g., because processor usage is on average, high, and opportunistic images can only be occasionally captured). By decoupling the opportunistic image capture and sensor signal capture and storage, fewer images may need to be discarded.

In yet another alternative, because evaluating a sensor signal history can require a sufficiently-large number of values and sufficiently-tight spacing, as sensor signals are typically more-frequently available, the system can evaluate the history in a continuous fashion, triggering image retention when some condition is satisfied and discarding images that shall not be retained. A compromise between quality and quantity of data can be struck, where most images are retained if only weak trigger condition(s) apply or only very few images are retained when strong trigger condition(s) apply.

Other alternatives include retaining most or all additionally captured images during an ongoing regular event; retaining images (from the forward-facing camera and/or driver-facing camera) if the driver's eyes are closed more than a certain number of seconds (along with time values); retaining images from a driver-facing camera if the driver's head is in a forward pitch for more than a certain number of seconds (which can indicate that the driver is nodding off); generating labels and images for informational events (e.g., "nodding off for more than 2 seconds"); using an asynchronous opportunistic image buffer, a synchronous ongoing signal value buffer, and an asynchronous retained image buffer (for transmission or DVR storage or download); and using "trigger fishing" statistics (setting-up a customized trigger rule to see if the driver exhibits the certain behavior and getting signal history values and images for it if he does, which can return some frequency of the trigger happening (e.g., x times per mile or hour), as well as images of the occasional happening.

As another alternative, instead of storing the subset of pixels for all the additionally-captured images and then filtering out images that should not be retained, the filter process can occur first, such that the subset of pixels are sampled for only those images that are retained and not for all the captured images.

In another alternate embodiment, the system described above can be used on its own or can be part of an on-vehicle event detection and reporting system configured to collect and provide event-based data corresponding to detected driver and/or vehicle-related events occurring during a driving excursion or even outside of the driving excursion. The event-based data can include vehicle and/or driver related data collected from components of, or components interacting with, the event detection and reporting system, including, but not limited to, vehicle devices, sensors, and/or systems.

Further, while the above examples were discussed in conjunction with capturing images around a vehicle, it should be understood that these embodiments can be used in non-vehicle and/or non-image contexts. For example, the general concept of capturing more data (not limited to images, e.g. LIDAR, radar) "when you can" (e.g., when processor time is available) but only retaining the data that is "good" (i.e., that meets a retention criterion) can be applied in any suitable environment (i.e., not just in a vehicle) and can use any suitable retention criterion (i.e., not just a signal from a sensor in a vehicle). As such, the example vehicle systems discussed above are merely some example implementations of the broader embodiment of an opportunistic curated data capture system (e.g., to maximize insight).

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein. Additionally, "in response to" can be directly in response to or indirectly in response to.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A non-transitory computer-readable storage medium storing computer-readable instructions that, when executed by one or more processors in a vehicle comprising an image capture device, cause the one or more processors to:
   cause the image capture device to capture a plurality of images at a regular frequency;
   cause the image capture device to capture a plurality of additional images in response to available processing time of the one or more processors being above a threshold; and
   implement a retention filter to select a subset of the plurality of additional images to retain based on a signal from at least one sensor in the vehicle.

2. The non-transitory computer-readable storage medium of claim 1, wherein the plurality of images captured at the regular frequency are compressed using a lossy compression technique and the plurality of additional images are compressed using a lossless compression technique.

3. The non-transitory computer-readable storage medium of claim 1, wherein the at least one sensor comprises a lane departure sensor and/or a yaw sensor.

4. The non-transitory computer-readable storage medium of claim 1, wherein the at least one sensor comprises one or more of the following: a driver-facing image capture device, a radar, a deceleration sensor, a steering angle sensor, a wheel speed sensor, a brake pressure sensor, a vehicle load sensor, a tire pressure sensor, an image analyzer, and a location sensor.

5. A non-transitory computer-readable storage medium storing computer-readable instructions that, when executed by one or more processors in a vehicle comprising an image capture device, cause the one or more processors to:
   cause the image capture device to capture a plurality of images at a regular frequency;
   cause the image capture device to capture a plurality of additional images in response to available processing time of the one or more processors being above a threshold; and
   select a subset of the plurality of additional images to retain based on at least one signal from at least one sensor in the vehicle,
   wherein the instructions, when executed by the one or more processors, further cause the one or more processors to:

store only a subset of image pixels of each image in the subset of the plurality of additional images.

6. The non-transitory computer-readable storage medium of claim 5, wherein the subset of image pixels of each image is sufficient to reconstruct each image from its subset of image pixels.

7. The non-transitory computer-readable storage medium of claim 5, wherein different subsets of image pixels are stored for at least some of the images in the subset of the plurality of additional images.

8. The non-transitory computer-readable storage medium of claim 7, wherein the instructions, when executed by the one or more processors, further cause the one or more processors to:
 read a look-up table to identify which image pixels to store for each image of the at least some of the images; and
 for each image of the at least some of the images, store an identifier that identifies which image pixels were stored.

9. The non-transitory computer-readable storage medium of claim 5, wherein the subset of image pixels of each image in the subset of the plurality of additional images is stored prior to selecting the subset of the plurality of additional images.

10. The non-transitory computer-readable storage medium of claim 5, wherein the subset of image pixels of each image in the subset of the plurality of additional images is stored after selecting the subset of the plurality of additional images.

11. The non-transitory computer-readable storage medium of claim 5, wherein the instructions, when executed by the one or more processors, further cause the one or more processors to:
 store only a subset of image pixels of every image in the plurality of additional images.

12. A method comprising:
 performing in one or more processors in a vehicle:
  capturing a plurality of images using an image capture device in the vehicle based on an available processing time of the one or more processors;
  using a compressive sensing sampling technique to store a subset of image pixels of at least some of the plurality of images; and
  applying a retention filter to the plurality of images to select a subset of the plurality of images to retain based on a signal from a sensor in the vehicle.

13. The method of claim 12, wherein the plurality of images are stored in a volatile buffer and the subset of the plurality of images are retained in non-volatile memory.

14. The method of claim 12, further comprising transmitting at least some of the subset of the plurality of images to an external processor for processing.

15. The method of claim 12, wherein the sensor in the vehicle comprises a lane departure sensor or a yaw sensor.

16. The method of claim 12, wherein the sensor in the vehicle comprises a driver-facing image capture device, a radar, a deceleration sensor, a steering angle sensor, a wheel speed sensor, a brake pressure sensor, a vehicle load sensor, a tire pressure sensor, an image analyzer, or a location sensor.

17. The method of claim 12, further comprising:
 reading a look-up table to identify which image pixels to store for each image in the at least some of the plurality of images; and
 for each image of the at least some of the plurality of images, storing an identifier that identifies which image pixels were stored.

18. The method of claim 12, further comprising:
 capturing a plurality of images at a regular frequency as part of an event detection system.

19. The method of claim 18, wherein the plurality of images captured at the regular frequency are compressed using a lossy compression technique, and wherein the compressive sensing sampling technique provides lossless compression.

20. A system comprising:
 means for causing an image capture device in a vehicle to capture a plurality of images based on an available processing time of one or more processors that capture an image;
 means for sampling a subset of image pixels of at least some of the plurality of images; and
 means for filtering the plurality of images by selecting a subset of the plurality of images to retain based on a signal from a sensor in the vehicle.

21. An opportunistic data capture system with subsequent curation, the system comprising:
 a memory; and
 one or more processors configured to:
  capture data in response to available processing time; and
  apply a retention filter to the captured data to select a subset of the captured data to retain in the memory based on a signal from a sensor in a vehicle.

22. The system of claim 21, wherein the data comprises image data.

* * * * *